(12) United States Patent
Nauen

(10) Patent No.: US 11,703,576 B2
(45) Date of Patent: Jul. 18, 2023

(54) METHOD FOR OPERATING A LIDAR SENSOR AND LIDAR SENSOR WHEREIN A TIME INTERVAL BETWEEN TWO CONSECUTIVE TIME WINDOWS OF LIGHT PULSES IS VARIED STOCHASTICALLY

(71) Applicant: OSRAM Beteiligungsverwaltung GmbH, Grünwald (DE)

(72) Inventor: Andre Nauen, Regensburg (DE)

(73) Assignee: OSRAM Beteiligungsverwaltung GmbH, Grünwald (DE)

( * ) Notice: Subject to any disclaimer, the term of this patent is extended or adjusted under 35 U.S.C. 154(b) by 510 days.

(21) Appl. No.: 16/763,359

(22) PCT Filed: Nov. 6, 2018

(86) PCT No.: PCT/EP2018/080295
§ 371 (c)(1),
(2) Date: May 12, 2020

(87) PCT Pub. No.: WO2019/101506
PCT Pub. Date: May 31, 2019

(65) Prior Publication Data
US 2020/0319319 A1    Oct. 8, 2020

(30) Foreign Application Priority Data
Nov. 23, 2017 (DE) ............. 10 2017 220 925.9

(51) Int. Cl.
*G01S 17/48* (2006.01)
*G01S 7/487* (2006.01)
(Continued)

(52) U.S. Cl.
CPC .......... *G01S 7/4873* (2013.01); *B60Q 1/0023* (2013.01); *G01S 7/4814* (2013.01);
(Continued)

(58) Field of Classification Search
CPC ....... B60Q 1/0023; G01S 17/00; G01S 17/06; G01S 17/04; G01S 17/10; G01S 17/26; G01S 17/66; G01S 17/88; G01S 7/48
(Continued)

(56) References Cited

U.S. PATENT DOCUMENTS

| 7,274,438 B2* | 9/2007 | Doemens ................ G01S 17/04 356/5.04 |
| 7,544,945 B2* | 6/2009 | Tan ........................ G01S 17/87 250/353 |
| 10,203,399 B2* | 2/2019 | Retterath .............. G01S 7/4863 |

FOREIGN PATENT DOCUMENTS

| EP | 2469297 A1 | 6/2012 |
| EP | 2846173 A1 | 3/2015 |
| WO | 201704010 A1 | 3/2017 |

OTHER PUBLICATIONS

Hirsch, Stefanie, International Search Report and Written Opinion of the International Searching Authority, for counterpart application PCT/EP2018/080295, dated Feb. 13, 2019, European Patent Office, Rijswijk, The Netherlands, 14 pages.
(Continued)

*Primary Examiner* — Que Tan Le
(74) *Attorney, Agent, or Firm* — Viering, Jentschura & Partner MBB

(57) ABSTRACT

Various implementations disclosed herein include a method for operating a LIDAR sensor, comprising repeatedly performing measurements in a respective measurement time window (M), at the beginning of which at least one measurement light pulse (A) having at least one predefined wavelength is emitted by the LIDAR sensor, and determining whether a light pulse (A') having the at least one predefined wavelength is detected by the LIDAR sensor within the measurement time window (M), wherein a time
(Continued)

interval (D1, D2, D3) between two consecutive measurement time windows (M) is varied.

12 Claims, 3 Drawing Sheets

(51) Int. Cl.
    *G01S 17/931*     (2020.01)
    *B60Q 1/00*     (2006.01)
    *G01S 7/481*     (2006.01)
    *G01S 17/10*     (2020.01)
    *G01S 17/00*     (2020.01)

(52) U.S. Cl.
    CPC ............ *G01S 7/4816* (2013.01); *G01S 17/00* (2013.01); *G01S 17/10* (2013.01); *G01S 17/931* (2020.01)

(58) Field of Classification Search
    USPC .............................................. 250/221.214 R
    See application file for complete search history.

(56) References Cited

OTHER PUBLICATIONS

Lindolf, Jurgen, German Search Report, for counterpart application DE 110 2017 220 925.9, dated Jul. 4, 2018, 8 pages.

\* cited by examiner

METHOD FOR OPERATING A LIDAR SENSOR AND LIDAR SENSOR WHEREIN A TIME INTERVAL BETWEEN TWO CONSECUTIVE TIME WINDOWS OF LIGHT PULSES IS VARIED STOCHASTICALLY

CROSS-REFERENCE TO RELATED APPLICATIONS

The present application is a National Stage application of, and claims priority, and the benefit of International Application No. PCT/EP2018/080295, filed Nov. 6, 2018, entitled "VERFAHREN ZUM BETREIBEN EINES LIDAR-SENSORS UND LIDAR-SENSOR", which claims priority, and the benefit of German Application No. 10 2017 220 925.9, filed Nov. 23, 2017, entitled "VERFAHREN ZUM BETREIBEN EINES LIDAR-SENSORS UND LIDAR-SENSOR", the entire contents of which are hereby incorporated by reference.

The invention relates to a method for operating a LIDAR sensor, which repeatedly performs measurements in a respective measurement time window, at the beginning of which at least one measurement light pulse having at least one predefined wavelength is emitted by the LIDAR sensor, and it is checked whether a light pulse having the at least one predefined wavelength is detected by the LIDAR sensor within the measurement time window. The invention also relates to a LIDAR sensor.

The function of a LIDAR (Light Detection and Ranging) sensor, or LIDAR, system is based on a propagation time measurement of emitted light signals. If these impinge on surfaces in the vicinity of the LIDAR sensor, a portion of the emitted power is reflected in the direction of the LIDAR sensor. Accordingly, the pulse echo can be recorded with a suitable sensor. If the pulse is emitted at a first time and the echo signal is acquired at a later, second time, the distance to the reflecting surface can be calculated from the propagation time which is given by the difference between the first and second times. A LIDAR sensor usually works with light pulses that have a specific wavelength, for example 905 nanometers, and a specific pulse length. In addition, each light pulse is typically assigned a measurement time window, which begins with the emission of the measurement light pulse. If objects that are very far away are to be detected by a measurement, such as objects at a distance of 300 meters, then this measurement time window, within which it is checked whether a reflected light pulse has been received, must last for at least two microseconds. Such measurement time windows are also typically spaced apart by a time interval.

The use of LIDAR sensors is now increasingly common in the automotive sector. Accordingly, LIDAR sensors are increasingly being installed in motor vehicles. A problem with the above approach can occur, for example, when two vehicles, each equipped with a LIDAR sensor, are moving towards each other. For example, if both motor vehicles have LIDAR systems of the same design, which generate their pulses regularly and at the same pulse frequency and operate in the same wavelength range, it can be the case that the first LIDAR sensor on the first motor vehicle may also receive transmission pulses from the second LIDAR sensor of the second vehicle in its corresponding measurement time windows. In such a case, the transmission pulses of the second LIDAR sensor generate a phantom object for the first LIDAR sensor. A particularly critical case occurs if the false echoes, i.e. the light pulses transmitted by the second LIDAR sensor, are received by the first LIDAR sensor earlier than the actual pulse echoes, i.e. the measurement light pulses transmitted by the first LIDAR sensor itself and at least partially reflected. This causes a phantom object to appear a shorter distance away than objects that are actually located in the vicinity of the first LIDAR sensor. Under certain circumstances, a driver assistance system in a vehicle would thus trigger unnecessarily sharp braking, which in turn could endanger other road users.

The object of the present invention is therefore to provide a method for operating a LIDAR sensor, and a LIDAR sensor, which are able to reduce the probability of detecting a phantom object as an actual object.

This object is achieved by means of a method for operating a LIDAR sensor and by a LIDAR sensor having the features in accordance with the respective independent claims. Advantageous embodiments of the invention are the subject matter of the dependent claims, the description and the figures.

In a method according to the invention for operating a LIDAR sensor the LIDAR sensor repeatedly performs measurements in a respective measurement time window, at the beginning of which at least one measurement light pulse having at least one predefined wavelength is emitted by the LIDAR sensor, and it is checked whether a light pulse having the at least one predefined wavelength is detected by the LIDAR sensor within the measurement time window. In addition, a time interval between two consecutive measurement time windows is varied.

The invention is based on the finding that, by varying the time intervals between the respective consecutive measurement time windows, pulse echoes can be easily distinguished from false echoes by observing or comparing the detected measurement signals of a plurality of consecutive measurement time windows. Such an observation or comparison of such consecutive measurement signals may, but does not necessarily, comprise an averaging of the multiple measurement signals that have been acquired in a predefinable number of consecutive measurement time windows. Averaging is normally used to improve the signal-to-noise ratio. In order to improve signal-to-noise ratios, in standard LIDAR systems multiple individual pulse measurements can be offset against one another, for example to improve the signal-to-noise ratio by averaging. In other words, the measurement results or the received measurement signals from multiple consecutive measurement time windows are averaged. These averaging operations are preferably carried out during a period in which even very fast moving objects can still be assumed to be quasi-static relative to the LIDAR sensor. For example, if an object is located at a distance from the LIDAR sensor, then for the quasi-static case the same pulse propagation times are obtained, at least approximately, in consecutive measurements for a plurality of consecutive measurements. The variation of the time interval between two consecutive measurement time windows has several advantages, based on the above findings. On the one hand, due to the temporal shift or the temporal variation of the interval between consecutive measurement time windows, it is less probable that false echoes will be received in multiple consecutive measurement time windows. Thus, even if a false echo is received in a measurement time window, then due to the temporal variation of the subsequent measurement time window it is more probable that a subsequent interfering pulse of another second LIDAR sensor, emitting periodically or even aperiodically, will now not fall into the corresponding measurement time window of the LIDAR sensor, and therefore will no longer be detected. On the basis of a temporal averaging of a plurality of measurement time windows, false echoes are therefore significantly less noticeable and can therefore be more easily discriminated. However, a particularly important advantage of the invention is the fact that, even if interfering signals or false echoes are still received in consecutive measurement time windows, the variation in the time interval between the measurement time windows also causes a corresponding variation of the respective propagation times of the consecutively received false echoes. Therefore, if consecutive measurement results for the pulse propagation times determined on the basis of the received measurement signals were plotted, for example, in a time histogram, the interfering pulses received in consecutive measurement time windows of the LIDAR sensor would be smeared over time. In contrast, for the actual pulse echoes of pulses which were also emitted by the LIDAR sensor itself, a peaked distribution is formed in such a time histogram. By applying, for example, suitable threshold methods, interfering pulses can thus be distinguished from actual measurement light pulses particularly simply.

It is particularly advantageous here if the time interval between the two consecutive measurement time windows is varied stochastically. Therefore, the method according to the invention and its embodiments allow false echoes and actual echoes to be discriminated, even if the false echoes are generated by a similar LIDAR sensor, the time base of which is also varying, in particular even if the latter is also varying stochastically. A stochastic variation is understood to mean a random variation. The stochastic variation of the measurement time windows can be based on random numbers. The source of the random numbers can be provided by standard computer science methods based on Fibonacci series, for example, but also by physical sources such as the thermal noise of a resistor. The distribution of the stochastic variation can also be arbitrary and, for example, follow a normal distribution. However, the stochastic variation is preferably equally distributed. An equal distribution allows a particularly uniform temporal smearing of the false echoes and hence the probability of forming a peak-like distribution in the time histogram for such false echoes is reduced to a minimum, which makes the distinction between actual pulse echoes and false echoes simpler and more reliable.

In a further advantageous embodiment of the invention, the time interval varies in such a way that the respective start times of two consecutive measurement time windows have a predefined minimum time interval between each other. On the one hand, this means that consecutive measurement time windows can advantageously be prevented from temporally overlapping. This advantageously ensures the temporal uniqueness of a received measurement light pulse. However, this minimum time interval can also advantageously ensure that a specific pulse frequency, which specifies the number of transmitted light pulses per second and is determined primarily by the thermal loading capacity of the light sources used, such as an infrared laser diode, is not exceeded. This minimum time interval can therefore be determined advantageously as a function of the light sources used, and thus always ensures a particularly efficient operation of the LIDAR sensor.

In a further advantageous embodiment of the invention the time interval is varied in such a way that the start times are spaced apart from one another by a time interval which is greater than the temporally first of two consecutive measurement time windows, in particular multiple times greater. The start times of each measurement time window are defined by the times at which the LIDAR sensor emits respective measurement light pulses. To this end the LIDAR sensor can be designed to cover a measurement range of up to a maximum of 600 meters, preferably up to a maximum distance of 300 meters. To cover a measurement range up to 300 meters, a measurement time window of two microseconds in length is required, and accordingly for a measurement range up to 600 meters, a measurement time window of four microseconds. The pulse frequency is in the range between one kilohertz and one megahertz, depending on the design of the LIDAR sensor. Preferably, the pulse frequency is less than 100 kilohertz, which is due to thermal limitations of the light sources used, such as laser diodes emitting at 905 nanometers. In the case of a pulse frequency that is less than or equal to 100 kilohertz, light pulses would be emitted at a time interval of ten microseconds or more, which is a multiple of the duration of a measurement time window. In other words, this advantageous design of the invention makes it possible, on the one hand, to ensure that consecutive measurement time windows do not overlap and, moreover, if the minimum time interval between respective consecutive start times is even several times greater than the measurement time windows, that the thermal limitations of the light sources used for the transmission of the measurement light pulses are taken into account.

In a further advantageous embodiment of the invention, the time interval is varied within a predefined maximum time interval, which defines a maximum variation amplitude. This variation amplitude can accordingly define an earliest time for the start of a measurement time window which, in particular, meets the requirements on the minimum time interval from the preceding measurement time window as described above, as well as a latest time for the start of the measurement time window. The actual start of the measurement time window is then chosen, preferably randomly, between the earliest and latest times thus defined. The length or size of this variation amplitude can be adjusted to suit the requirements of the system.

It is advantageous here if a value of the maximum variation amplitude is determined as a function of a quality parameter for characterizing the detection quality of the LIDAR sensor, in particular as a function of a resolution or a signal-to-noise ratio. Thus, it can advantageously be ensured that the propagation times of consecutive detected false echoes differ much more significantly than those of actual pulse echoes, i.e. the pulses emitted by the LIDAR sensor itself and at least partially reflected on an object.

In addition, the maximum variation amplitude can be determined with reference to a predefined time point, which is determined as a function of the start time of the preceding measurement time window. This has the advantage that the above-mentioned minimum time interval can be maintained by determining the earliest possible start time of a measurement time window with reference to the start time of the preceding measurement time window, which is defined by the time at which a measurement light pulse was emitted.

In a further advantageous embodiment of the invention, signals received by the LIDAR sensor during the respective measurement time window are evaluated, wherein an averaging of the signals received in the measurement time windows is performed for a predefined number of measurement time windows, in particular consecutive measurement time windows. This averaging can improve the signal-to-noise ratio. Although an averaging of multiple consecutive measurements also has a positive effect on the ability to differentiate actual echoes from false echoes, a temporal averaging of consecutive measurements is not in fact necessary. An advantageous discrimination ability is also possible solely by observing and comparing consecutive measurements without having to average these measurement results. Such a comparison is possible, for example, by analyzing a propagation time histogram, as described in more detail below.

Therefore, a further advantageous embodiment of the invention is provided if, in the evaluation of a signal received by the LIDAR sensor within a given measurement time window, it is checked whether the received signal comprises at least one light pulse which differs from a noise signal and has the at least one predefined wavelength, and if so, a propagation time of the at least one light pulse is determined and the determined propagation time is entered into a propagation time histogram, wherein the frequencies of the propagation times of the light pulses received in multiple, in particular consecutive, measurement time windows are summed in the propagation time histogram. For example, if a particular object is located at a distance from the LIDAR sensor, the LIDAR sensor is detected in consecutive measurement time windows of that object by the light pulses reflected by the object that are emitted by the LIDAR sensor at the beginning of the respective measurement time windows. Therefore, if the distance of this object does not change during these consecutive measurements or measurement time windows, the same propagation times are always recorded for the respective light pulses reflected at the object, at least approximately and within the measurement accuracy. If these multiple, at least approximately equal, propagation times are entered into a propagation time histogram, such as the above-mentioned time histogram, then a peak is produced for these recorded propagation times. The propagation time histogram therefore indicates the frequency with which a specific propagation time was recorded in a predefined number of measurements. However, in the case of false echoes detected in multiple consecutive measurement time windows, there will be no peak in the corresponding propagation time histogram, which is due to the variation in the time interval between two consecutive measurement time windows. If this time interval is varied stochastically, for example, the propagation times of a false echo which was recorded in multiple consecutive measurement time windows are also statistically distributed in the propagation time histogram. The peak generated due to an actual object and the statistically distributed propagation times of the false echoes can be distinguished by considering such a propagation time histogram. Due to a statistical variation of the time interval between two consecutive measurement time windows, the periodically or aperiodically arriving pulses of a different LIDAR sensor are distributed along the time axis, forming a kind of background that allows the actual relevant echo signal to be discriminated without difficulty. For example, a suitable threshold value can be used for discrimination, such as the mean value of the histogram frequencies or a multiple thereof, for example double the value.

In a further advantageous embodiment of the invention, the variation amplitude is greater than a mean width of a distribution in the propagation time histogram associated with a peak. The distribution associated with a peak represents a distribution in the propagation time histogram resulting from the propagation times of actual consecutive echoes, i.e. the measurement light pulses emitted by the LIDAR sensor and at least partially reflected at an at least quasi-static object. Due to a finite resolution capability and depending on the measurement quality and the signal-to-noise ratio, the summation of actual echoes in the propagation time histogram always results in a peak with finite width. In order to distinguish the distributed false echoes sufficiently well from the peak resulting from actual echoes, it is correspondingly advantageous if the variation amplitude is also greater, in particular multiple times greater, for example at least five times greater and a maximum of one hundred times greater, than the mean width of such a peak in the propagation time histogram resulting from actual echoes.

However, the analysis of the propagation time histogram is not only advantageous with regard to individual measurements, but can also be performed in an analogous way on the basis of measurements averaged over multiple measurement windows. Therefore, a further advantageous embodiment of the invention is provided if an average of a plurality of signals received in a predefined number of consecutive measurement time windows is provided as an averaged measurement signal, wherein in the evaluation of the averaged measurement signal it is checked whether the averaged measurement signal comprises at least one light pulse which is different from a noise signal and has the at least one predefined wavelength, and if so, a propagation time of the at least one light pulse is determined and the determined propagation time is entered into a propagation time histogram, wherein the frequencies of the propagation times of the light pulses that were determined from multiple, in particular consecutive, averaged measurement signals are summed in the propagation time histogram. As soon as a pulse is detected on the basis of a plurality of consecutive and averaged measurements, its propagation time can be determined and entered into the propagation time histogram, in the exact same manner as described earlier. The preceding averaging over multiple measurement time windows improves the signal-to-noise ratio and, above all, facilitates the differentiation of received pulses from the noise background.

To examine whether the single measurement signal or the averaged measurement signal comprises at least one light pulse having the at least one predefined wavelength, which is different from a noise signal, a simple threshold method, for example, can again be used. For example, in doing so the contiguous signal components that exceed a predefined threshold value can be classified as being associated with a light pulse or echo respectively.

Furthermore, it is also advantageous if, based on the light pulses received in respective measurement time windows, environmental information is provided, wherein when providing the environmental information only those light pulses for which the propagation times have frequencies in the propagation time histogram that exceed a predefined threshold are taken into account. Due to the temporal variation according to the invention of the intervals between the measurement time windows, it is now advantageously possible to distinguish between actual echoes and false echoes by defining a simple threshold value based on a propagation time histogram. Accordingly, in the final evaluation and provision of the environmental information it is then possible to take into account only those light pulses which have the propagation times that exceed this limit according to the propagation time histogram, and are therefore most likely also to be due to the reflection of measurement light pulses emitted by the LIDAR sensor itself. For example, as mentioned above, such a suitable threshold value can be a multiple of the mean value of the histogram frequencies.

In addition, the invention also relates to a LIDAR sensor which is designed to perform measurements repeatedly in a respective measurement time window, at the beginning of which at least one measurement light pulse having at least one predefined wavelength is emitted by the LIDAR sensor, and it is checked whether a light pulse having the at least one predefined wavelength is detected by the LIDAR sensor within the measurement time window. In addition, the LIDAR sensor is designed to vary a time interval between two consecutive measurement time windows.

The advantages mentioned with regard to the method according to the invention and its embodiments apply in the same way to the LIDAR sensor according to the invention. In addition, the processing steps mentioned in connection with the method according to the invention and its embodiments enable the further refinement of the LIDAR sensor according to the invention by means of other material features.

In particular, the LIDAR sensor has a control device designed to carry out the processing steps of the method according to the invention or one of its embodiments.

In addition, the LIDAR sensor can be designed, for example, to emit light pulses at a wavelength preferably in the range between 850 nanometers and 1600 nanometers, or for example at 905 nanometers or 1064 nanometers or 1548 nanometers or 5600 nanometers or 8100 nanometers. Other wavelengths are also conceivable, such as 600 nanometers, 650 nanometers, 700 nanometers, 750 nanometers, 800 nanometers or 850 nanometers. Furthermore, the LIDAR sensor can be designed to emit light pulses at a frequency between one kilohertz and one megahertz, preferably at a frequency of less than 100 kilohertz. In addition, the detection range of the LIDAR sensor can range from a few centimeters, for example 20 centimeters, up to 300 meters, and possibly even further. Accordingly, for example, the measurement time windows can last two microseconds, which corresponds to the propagation time of a light pulse in the case of a reflection at an object 300 meters away. However, the respective measurement time windows do not necessarily always need to remain the same, but can also be dynamically adjusted to the distance of recently detected objects, for example. The individual light pulses can have a length of a few nanoseconds, such as one nanosecond, five nanoseconds, ten nanoseconds, 15 nanoseconds, 20 nanoseconds, and so on, but preferably less than five nanoseconds. The LIDAR sensor can also be designed, for example, as a flash LIDAR, which generates its resolution exclusively by means of the detector, which in this case consists of a plurality of individually readable segments arranged in a matrix. The LIDAR sensor can also be designed as a raster LIDAR, which has an emitter that emits the measurement light pulses in different spatial directions, in particular sequentially in time, wherein a single segment is also sufficient as a detector. The LIDAR sensor can also be formed as a combination of both LIDAR types, for example, in such a way that a raster motion occurs in one dimension, but the resolution in the second dimension is achieved by means of a detector that is angle-selective in this dimension. Depending on the exemplary embodiment, the emitter of the sensor can consist of either a single emitter or a one- or two-dimensional emitter matrix, each part of which can be individually controlled. In principle, both strip emitters and VCSEL types, e.g. VCSEL and VECSEL, in other words surface emitters, can be used. The light source emitters can therefore be provided in principle both as LEDs and as laser diodes. The individual light pulses emitted by such an emitter can have a power in the range of several milliwatts (VCSEL) and between 30 Watt and 200 Watt (VECSEL).

The LIDAR sensor according to the invention or one of its embodiments is preferably used in motor vehicles. Accordingly, a motor vehicle having a LIDAR sensor according to the invention or one of its embodiments is also intended to be considered as part of the invention. In addition, the LIDAR sensor can be fitted in a vehicle light, in particular in a front headlamp of the vehicle. In principle, however, there are no limits to the application areas of the LIDAR sensor according to the invention or its embodiments. The sensor can thus also be used, for example, in airplanes, drones, ships, lighthouses, movable lighting equipment in the entertainment and studio lighting sector, or similar applications.

Further advantages, features and details of the invention arise from the claims, the following description of preferred embodiments and from the drawing.

BRIEF DESCRIPTION OF THE DRAWINGS

In the following the invention will be explained in further detail based on exemplary embodiments. In the figures:

FIG. 1 shows a schematic representation of a motor vehicle 10 having a LIDAR sensor 12 according to an exemplary embodiment of the invention, and an oncoming second motor vehicle 14 having an additional second LIDAR sensor 16. The LIDAR sensor 12 according to an exemplary embodiment of the invention has an emitter 12a for the emission of measurement light pulses A, a detector 12b for the detection of at least part of the reflected measurement light pulse A', which was reflected at an object in the environment U, as in this example at the oncoming second motor vehicle 14, and a control device 12c which is designed to read out the detector 12b, evaluate the signals detected by the detector 12b and also to control the emission of the measurement light pulses A by the emitter 12a. The function of a LIDAR system, such as the LIDAR sensor 12 described here, is based on a propagation time measurement of emitted light signals, such as the measurement light pulses A emitted here. If these impinge on surfaces in the environment U of the LIDAR sensor 12, a portion of the emitted power is reflected in the direction of the LIDAR sensor 12, as shown by the reflected measurement light pulse A' in FIG. 1. Accordingly, the pulse echo, i.e. here the reflected measurement light pulse A', can be recorded with a suitable detector 12b. If the pulse A is emitted at time t0 and the echo signal is acquired at a later time t1, then the distance d to the reflecting surface, here the motor vehicle 14 traveling in the opposite direction, can be computed from the propagation time $\Delta t = t1 - t0$ according to $d = \frac{1}{2}\Delta t \cdot c$, where c is the value of the speed of light. This method works most practically with light pulses which, when using semiconductor laser diodes with a wavelength of 905 nanometers, for example, have a pulse width (FWHM) of between 0.1 nanoseconds and 100 nanoseconds. In general, however, the LIDAR sensor 12 can be designed to emit measurement light pulses A of any wavelength, preferably in the infrared wavelength range between 850 nanometers and 1600 nanometers, or in other wavelength ranges. In addition, the LIDAR sensor 12 can use different transmitter and receiver configurations to capture the distance information in different spatial directions. This then creates a two-dimensional image of the environment, which contains the complete set of three-dimensional coordinates for each resolved spatial point. The LIDAR sensor 12 can be used in a plurality of applications. Its use in a motor vehicle 10 is described here as an example.

Figure 1:
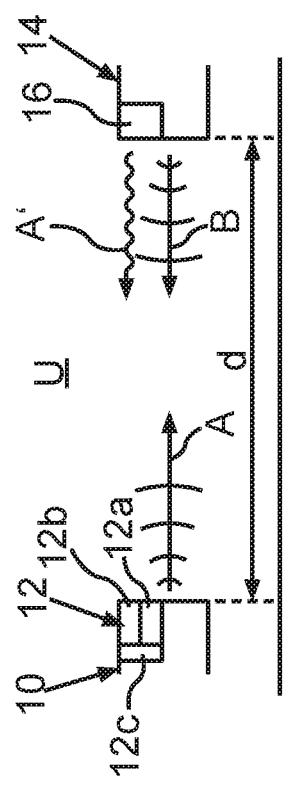
FIG. 1 shows a schematic representation of a motor vehicle having a LIDAR sensor according to an exemplary embodiment of the invention, and an oncoming second motor vehicle having an additional LIDAR sensor.

However, in a conventional LIDAR sensor, such as the LIDAR sensor 16 of FIG. 1, in the situation shown in FIG. 1 the problem arises that the respective LIDAR systems may interfere with each other when two vehicles, each equipped with a corresponding LIDAR sensor 16 move towards each other. In such a case, the first conventional LIDAR sensor 16, which would then be located at the position of the LIDAR sensor 12 in FIG. 1, can detect the echo signals reflected at the oncoming vehicle 14 and thereby generated, as is in fact intended, but under certain conditions it can also detect the light pulses emitted by the second conventional LIDAR sensor 16 of the oncoming vehicle 14. These particular conditions under which this may be the case are, for example, that the two LIDAR systems are operating in the same wavelength range, which is very likely because a majority of the current LIDAR approaches rely on the use of 905-nanometer laser diodes. Another condition is that the transmission pulses of the second conventional LIDAR sensor 16 of the oncoming vehicle 14 arrive within a corresponding detection time of the first conventional LIDAR sensor 16, i.e. within a measurement time window within which the first conventional LIDAR sensor 16 records the detector signal. In addition, if the respective pulses are generated sufficiently regularly and with approximately equal pulse frequencies, it is even possible for the first conventional LIDAR sensor 16 to detect false echoes, i.e. the pulses B generated by the second conventional LIDAR sensor 16, in repeated consecutive measurement windows. This is most likely to be the case with identically designed LIDAR systems, but also different systems which use the same laser diodes with their respective requirements on pulse frequency and duty cycle, for example, can also satisfy this condition. In addition, the incoming pulse power of the pulse emitted by the second conventional LIDAR sensor 16 must be above the detection threshold of the first conventional LIDAR sensor, which in the situation shown in FIG. 1 would obviously be the case, since there a direct optical path would exist between the two conventional LIDAR systems if the first conventional LIDAR sensor 16 were to be located at the position of the LIDAR sensor 12 according to the exemplary embodiment of the invention. However, this is equally possible in the case of ambient reflections. In such a situation, the transmission pulse B of the second conventional LIDAR sensor 16 would then generate a phantom object in a conventional first LIDAR sensor 16. Two cases can then be distinguished: if the transmission pulse B of the second conventional LIDAR sensor 16 arrives within the measurement time but later than the echo signal of the actual measurement light pulse emitted by the first conventional LIDAR sensor, a false target is then created at a greater distance than the actual distance between the two motor vehicles, which is not a major factor for the hazard recognition and processing by the first vehicle, since of course only the closest target is relevant in that respect. However, if the first conventional LIDAR sensor 16 has multiple-target capability within a solid angle segment, this may also produce an undesirable effect. The opposite case, that of the earlier arrival of the false pulse B, is definitely critical, since here a false target is created at a shorter distance than the actual distance between the two vehicles. Under certain circumstances, a partially autonomously driven vehicle, for example, would thus unnecessarily apply sharp braking, which in turn could endanger other road users.

Figure 2:
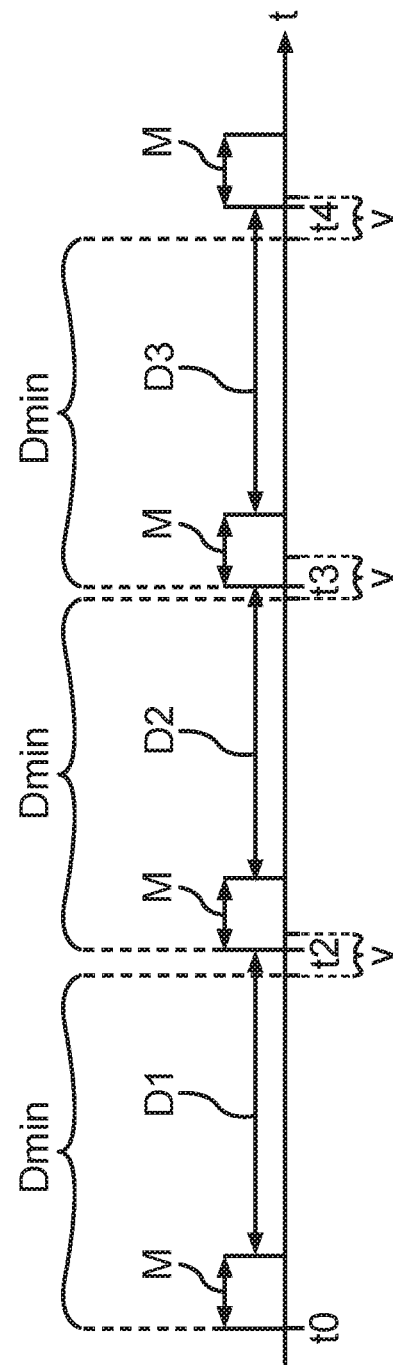
FIG. 2 shows a schematic representation for illustrating a method for operating a LIDAR sensor according to an exemplary embodiment of the invention, in which a time interval between measurement time windows is stochastically varied.

This problem is now advantageously solved by the invention by the fact that the time base of the pulse generation of the LIDAR sensor 12 is varied, in particular stochastically, as is apparent from FIG. 2. FIG. 2 shows a schematic representation to illustrate a method for operating a LIDAR sensor 12. In this case, the LIDAR sensor 12 emits respective measurement light pulses A repeatedly at the beginning of respective measurement time windows M. During each of these measurement time windows M, a check is also made as to whether a light pulse A' was received within these measurement time windows M. For example, the respective measurement time windows M can have a length of two microseconds, which corresponds to a maximum detection range of 300 meters. Depending on the desired maximum detection range, however, the measurement time windows M can also have different lengths. In addition, the respective consecutive measurement time windows M are separated from each other by a time interval D1, D2, D3. Depending on the light sources used by the LIDAR sensor 12, the respective start times t0, t2, t3, t4 of the respective measurement time windows M should not be less than a specific minimum time interval Dmin. Furthermore, the respective start times t0, t2, t3, t4, and thus the emission of a respective measurement light pulse A, are stochastically varied in their timing, preferably while maintaining this minimum time interval Dmin. For this purpose, a time interval can be defined which defines a maximum variation amplitude v. This means that the start time t0, t2, t3, t4 is chosen randomly, but within this maximum variation interval v. For example, a variation amplitude v has been selected that corresponds to half of each respective measurement time window M, but both smaller and larger values are also possible. In addition, this maximum variation amplitude v is defined here with reference to a predefined time, namely as a function of the start time t0, t2, t3, t4 of the respective preceding measurement time window M, in particular in such a way that the minimum distance Dmin from respective consecutive start times t0, t2, t3, t4 is maintained. This can be implemented, for example, by appending the maximum variation amplitude v directly to the minimum time interval Dmin at the start time t0, t2, t3, t4 of the preceding measurement time window M. Any other embodiments are also possible, however.

This variation in the temporal interval D1, D2, D3, in particular stochastic variation, makes it possible advantageously to distinguish between echoes A' based on the measurement light pulses A emitted by the LIDAR sensor 12 itself and false echoes, representing measurement light pulses B transmitted by other LIDAR sensors, as will be explained below. The basis for this is a single measurement, as shown schematically in FIG. 3, for example.

Figure 3:
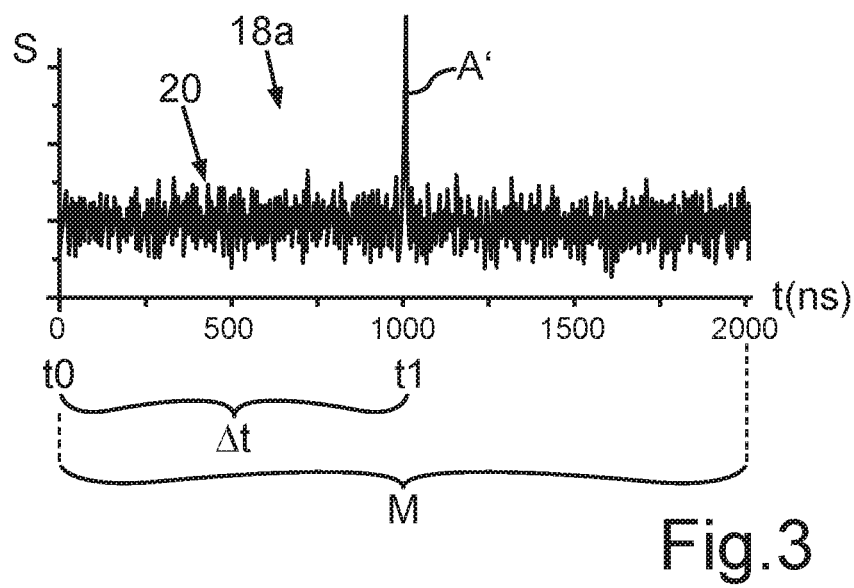
FIG. 3 shows a graphical representation of the signal received from the LIDAR sensor in a measurement time window.
Figure 4:
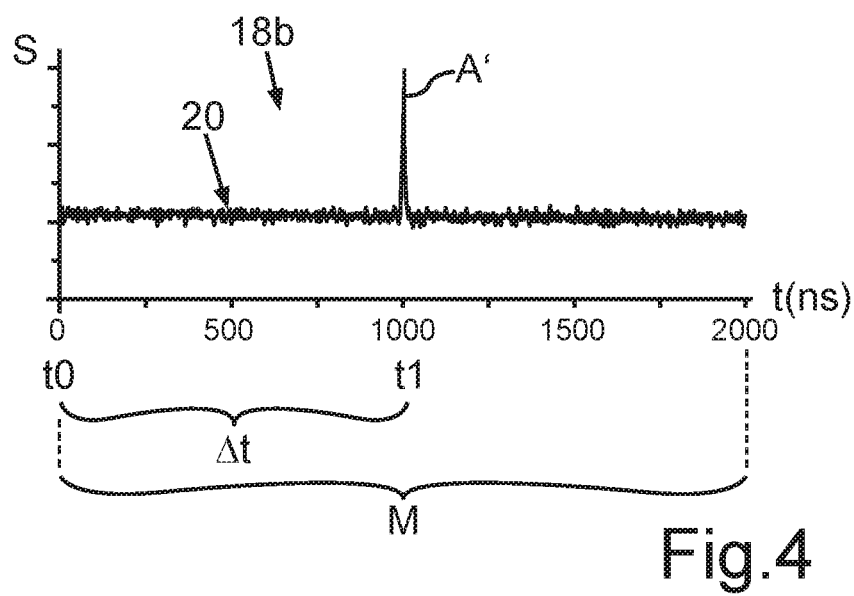
FIG. 4 shows a graphical representation of the temporal averaging of a plurality of signals received by the LIDAR sensor during consecutive measurement time windows.

FIG. 3 shows a graphical representation of a signal 18a received by the LIDAR sensor 12 during a measurement time window M. On the abscissa, the time t from the start time t0 of the measurement time window M is plotted in nanoseconds, and on the ordinate the signal amplitude S. Such a single measurement therefore begins with the emission of a measurement light pulse A at the start time t0 of a measurement time window M. In a typical single measurement, a clearly recognizable pulse A' against a background noise level 20 will be obtained after the propagation time Δt within such a single measurement. This allows the propagation time Δt to be determined and from this, the distance to an object from which this measurement light pulse A was reflected. In order to improve the noise ratio, for example at a signal-to-noise ratio of less than two, it may also be advantageous to average a plurality of such individual measurements, i.e. a plurality of such signals 18a received in consecutive measurement time windows M, resulting in an averaged measurement signal 18b, an example of which is shown in FIG. 4 for averaging five consecutive measurements. However, more than five consecutive measurements can also be averaged, preferably between five and 100. Also in FIG. 4, again on the abscissa, the time t from the respective start times t0 of the averaged measurement time windows M is plotted in nanoseconds and the signal amplitude S of the resulting averaged measurement signal 18b is plotted on the ordinate.

If the pulse frequency, averaged over time, at which the individual measurement light pulses A are emitted is, for example, 100 kilohertz and if 100 consecutive measurements are combined to form an averaged measurement signal 18b, then the total measurement time in this example is one millisecond. Assuming a speed of both oncoming vehicles 10, 14 of 100 km/h, this results in a relative movement of 56 millimeters per millisecond, which is in the range of the distance measurement accuracy of a typical LIDAR system. This means that in most situations, even in the case of an averaging of 100 individual measurements, the quasi-static case can still be assumed, which means that the distance between the two vehicles 10, 14 does not change significantly within the total measurement time.

From the signals 18a, or averaged measurement signals 18b, ultimately received from the LIDAR sensor 12 in respective measurement time windows M, the distance to an object can then be determined as follows: the term 'single measurement' is used in the following for the determination of only one value for the propagation time Δt of the measurement, regardless of whether this value for the propagation time Δt is based on the received signal 18a in only one measurement time window M or on the basis of a plurality of averaged signals, which ultimately provide the averaged measurement signal 18b. Such single measurements are then continuously repeated, so that an ensemble of respective propagation times Δt results. The number of single measurements collected depends on the exact requirements and the design of the LIDAR system. It is advantageous if the measurement duration of the data ensemble only requires a time interval within which a quasi-static situation can be assumed with regard to the required accuracy of the distance measurement. Otherwise, the values of the ensemble would change over time, which would at least reduce the measurement accuracy. To determine the distance to an object, the respective values of the propagation times Δt determined in this way are then plotted in a histogram 24 (see FIG. 6). If all individual values of the ensemble of the propagation times Δt were identical, this would result in a single histogram line of height n, in the case in which the ensemble is formed from n individual measurements, where n represents an integer. Realistically, however, measurement inaccuracies result in a finite distribution width 5A (cf. FIG. 6) in the histogram 24.

Figure 5:
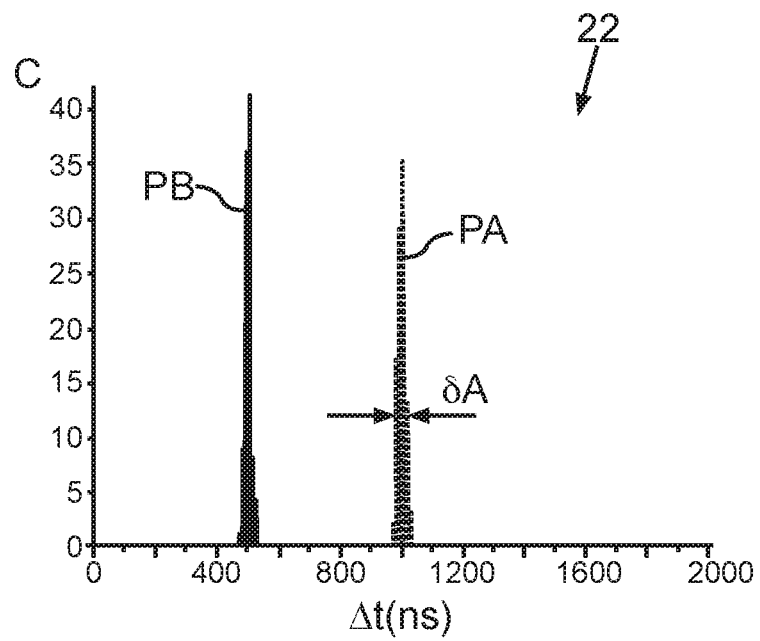
FIG. 5 shows a graphical representation of a propagation time histogram, created based on measurements made with a LIDAR sensor according to the prior art.

In the case in which a conventional LIDAR sensor receives false echoes from another LIDAR sensor in addition to the actual echoes, a propagation time histogram 22 as shown in FIG. 5 is obtained. In this case the propagation time Δt is plotted in nanoseconds on the abscissa and the frequencies C on the ordinate. Therefore, since in addition to the measurement light pulses emitted by the conventional LIDAR sensor 16 itself, which would then correspond to the measurement light pulses labeled as A in FIG. 1, the measurement light pulses B emitted by another conventional LIDAR sensor 16 have also been received, in this case two peaks PA, PB are obtained. Here, PA refers to the peak which is due to the measurement light pulses emitted by the conventional LIDAR sensor 16 itself, whereas the peak labeled PB is due to the reception of the measurement light pulses B of the other conventional LIDAR sensor 16 of the oncoming vehicle 14. Depending on the configuration, this additional peak PB can be located at different points on the time axis Δt. FIG. 5 shows the case in which both measurement light pulses A, B of the two conventional LIDAR sensors 16 were emitted simultaneously. This produces a phantom object at half the distance. In the case that the time bases of both conventional LIDAR systems are shifted relative to each other by a constant value, the false echo would accordingly land at another point on the time axis Δt, which is irrelevant to the fundamental discussion.

In contrast, the invention enables the detection of such a phantom object to be avoided by varying, in particular stochastically, the respective time intervals D1, D2, D3 between any two consecutive measurement time windows M. Therefore, if the time base of the LIDAR sensor 12, i.e. the pulse emission and the start of the measurement time, is stochastically varied in the selected situation, then the periodically arriving pulses of another LIDAR sensor 16 are distributed on the time axis of the corresponding propagation time histogram 24 that indicates the propagation times Δt, as shown schematically in FIG. 6, so that they form a kind of background and the actually relevant echo signal can thus be discriminated without difficulty. Here again, the propagation time Δt in nanoseconds is plotted on the abscissa and the frequencies C on the ordinate. In particular, the corresponding propagation times Δt of the apparent pulses B, which form the distribution PB in the propagation time histogram 24, are now distributed over a propagation time interval corresponding to the variation amplitude v. Thus, in order to provide a good discrimination between such apparent pulses and actual pulses, it is therefore advantageous if the variation amplitude v is greater, in particular much greater, than the width 5A of the histogram distribution PA corresponding to the device's own measurement light pulses A. It is particularly advantageous here if the variation amplitude v is selected to be between five times and one hundred times the width 5A of the distribution PA. The width 5A of this distribution PA again depends on the measurement quality and the measurement accuracy of the LIDAR sensor 12 used. This can be determined experimentally, for example, or specified as an appropriate estimate. Because the current measurement quality may also be affected by environmental parameters, such as the ambient brightness and extraneous light or the distance from detected objects, it is also advantageous, for example, if the variation amplitude v is not a fixed value, but is varied, for example, as a function of a current quality parameter of the LIDAR sensor 12. Such a quality parameter can represent, for example, the current measurement accuracy and can be determined, for example, as a function of the current signal-to-noise ratio or similar. This quality parameter can also be determined as a function of one or more of the above-mentioned variables that affect the measurement accuracy.

Figure 6:
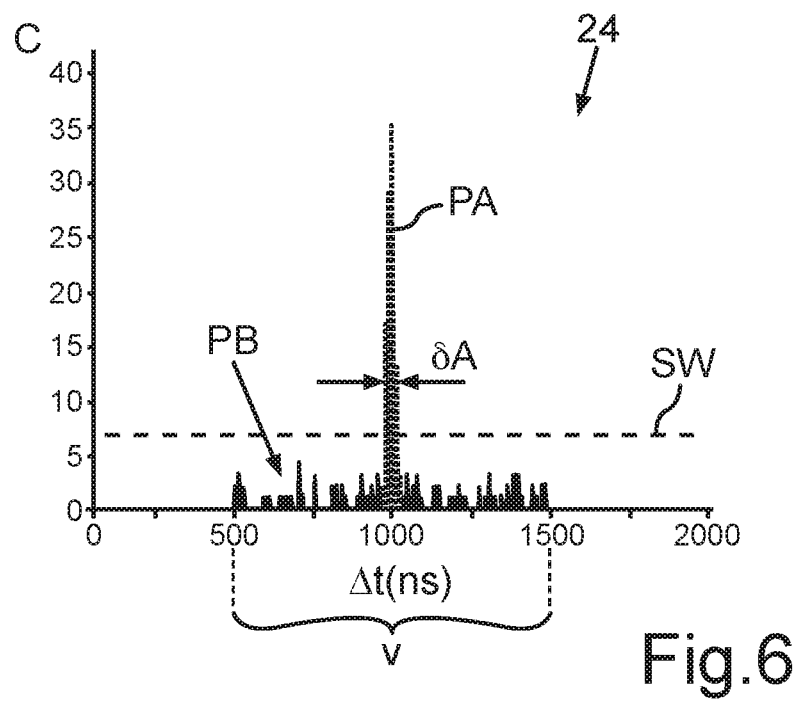
FIG. 6 shows a schematic representation of a propagation time histogram, created based on measurements made with a LIDAR sensor according to an exemplary embodiment of the invention.

A possible criterion for the discrimination of the apparent pulses might use a threshold value SW, normalized to the mean value of histogram frequencies C, for example in such a manner that only histogram values having frequencies C which are greater than twice the mean value of the histogram frequencies C are used for the peak detection and thus for the propagation time measurement. An example of such a threshold value SW is also shown in FIG. 6. The temporal position of the maximum histogram value could then simply be used to determine the time of the peak position.

To provide the stochastic variation of the distances D1, D2, D3 between the respective consecutive measurement time windows M, random numbers can be used, in particular evenly distributed random numbers, or else other distributions can be selected depending on the source of the random numbers. The source of the random numbers can be provided by standard computer science methods based on Fibonacci series, for example, but also by physical sources such as the thermal noise of a resistor.

Overall, the above enables a LIDAR sensor and a method for operating a LIDAR sensor to be provided, which by using the temporal variation of the intervals between the respective measurement windows allows interference caused by signal pulses from other LIDAR systems to be effectively suppressed. A particularly advantageous feature of the method is a stochastic variation of the intervals, as this additionally enables interference due to LIDAR sensors of the same design to be suppressed even more effectively.

LIST OF REFERENCE SIGNS 10 motor vehicle
12 LIDAR sensor
12a emitter
12b detector
12c control device
14 second motor vehicle
16 second LIDAR sensor
18a received signal
18b averaged measurement signal
20 background noise level
22 propagation time histogram
24 propagation time histogram
A measurement light pulse
A' reflected measurement light pulse
B light pulse of the second LIDAR sensor
C frequency
D1, D2, D3 time interval
Dmin minimum time interval
M measurement time window
PA propagation time distribution of the pulse echoes of the LIDAR sensor
PB propagation time distribution of the false echoes
S signal amplitude
SW threshold value
U environment
V variation amplitude
t0, t2, t3, t4 start times of the measurement windows
t1 reception time of the echo
$\Delta t$ propagation time
$\delta A$ width of the propagation time distribution

The invention claimed is:

1. A method of determining the presence of an object in an environment comprising:
   emitting consecutive light pulses, by a first LIDAR sensor, in consecutive respective time windows, wherein each light pulse has a predefined wavelength, wherein a time interval between two consecutive time windows is varied stochastically;
   detecting one or more reflected light pulses within the consecutive respective time windows as one or more signals;
   determining whether the one or more signals corresponds to one or more light pulses emitted from a second LIDAR sensor; and
   suppressing the one or more signals corresponding to the one or more light pulses emitted from a second LIDAR sensor based on the determination thereof when determining the presence of the object in the environment.

2. The method as claimed in claim 1, wherein the time interval is varied within a predefined maximum time interval which defines a maximum variation amplitude.

3. The method as claimed in claim 2, wherein a value of the maximum variation amplitude is determined as a function of a quality parameter for characterizing the detection quality of the LIDAR sensor, wherein the quality parameter is based on a resolution or a signal-to-noise ratio.

4. The method as claimed in claim 2, wherein the maximum variation amplitude is determined with reference to a predefined time point, which is determined as a function of the start time of the preceding measurement time window.

5. The method as claimed in claim 1, further comprising evaluating the signals, performing an averaging of the one or more signals received in the measurement time windows for a predefined number of measurement time windows.

6. The method as claimed in claim 1, further comprising determining whether the one or more signals comprises at least one light pulse different from a noise signal and having the at least one predefined wavelength by:
   determining a propagation time of the one or more reflected light pulses, and
   entering the determined propagation time into a propagation time histogram, wherein the frequencies of the propagation times of the one or more reflected light pulses received in multiple measurement time windows are summed in the propagation time histogram.

7. The method as claimed in claim 1, wherein the method further comprises determining whether an averaged signal of the one or more signals comprises at least one light pulse different from a noise signal and having at least one predefined wavelength by:
   determining a propagation time of the one or more reflected light pulses, and
   entering the determined propagation time into a propagation time histogram, wherein the frequencies of the propagation times of the one or more reflected light pulses that were determined from multiple averaged signals are summed in the propagation time histogram.

8. The method as claimed in claim 6, wherein the variation amplitude is greater than a mean width of a propagation time histogram associated with a peak.

9. The method as claimed in claim 6, further comprising obtaining environmental information corresponding to the one or more reflected light pulses, wherein only those reflected light pulses are taken into account where the propagation times have frequencies in the propagation time histogram that exceed a predefined threshold.

10. A LIDAR sensor configured to perform the method of claim 1.

11. The LIDAR sensor as claimed in claim 10, wherein the LIDAR sensor is incorporated into a motor vehicle.

12. The motor vehicle as claimed in claim 11, wherein the LIDAR sensor is installed in an exterior light of the motor vehicle.

\* \* \* \* \*